June 26, 1928.  W. CAMPBELL  1,675,091

ELECTRIC FIRELESS COOKER

Filed June 17, 1925

Inventor
Wm. Campbell
By Freas and Bond
Attorneys

Patented June 26, 1928.

1,675,091

UNITED STATES PATENT OFFICE.

WILLIAM CAMPBELL, OF ALLIANCE, OHIO.

ELECTRIC FIRELESS COOKER.

Application filed June 17, 1925. Serial No. 37,682.

This invention relates to cookers or ovens, and more especially to cookers in which the cooking is done within a closed, insulated chamber heated by electric heating elements located therein.

Devices have been constructed for automatically opening the electric circuit to the heating element when the food being cooked reaches a certain temperature, but such devices do not provide for immediately closing the circuit when the food starts to cool below such temperature.

The object of the improvement is to provide means, controlled by the temperature of the food being cooked, for automatically opening the circuit to the heating elements when the food reaches a predetermined temperature, and for automatically closing the circuit as soon as the food starts to drop below said temperature, whereby the food may be held at substantially an even temperature while cooking; and to provide means for adjusting the thermally controlled device to cause the same to operate at any desirable temperature, whereby an even, low temperature may be maintained for baking cakes and the like or an even, high temperature may be maintained for cooking foods requiring the same.

The above and ancillary objects may be attained by locating the controlling thermostat in the open, outside of the cooker or oven, and providing a conduit communicating with the interior of the cooker and directed toward the thermostat, whereby a jet of steam from the cooking food will be impinged upon the thermostat causing the same to operate a switch to open the circuit.

Since the thermostat is located in the open, it will be quickly cooled by the temperature of the room, as soon as the jet of steam ceases to impinge the same, causing the circuit to close, thus keeping the cooking food at nearly an even temperature.

An embodiment of the invention is illustrated in the accompanying drawing, in which—

Figure 1:
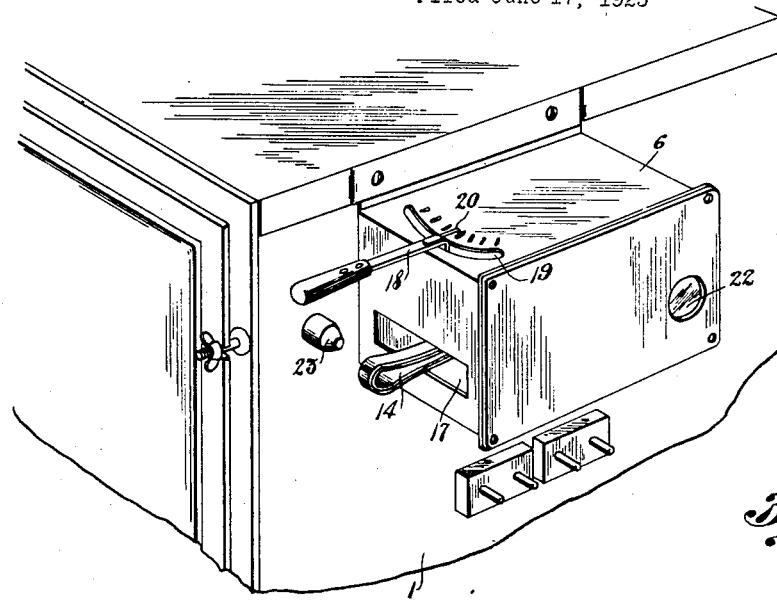
Figure 2:
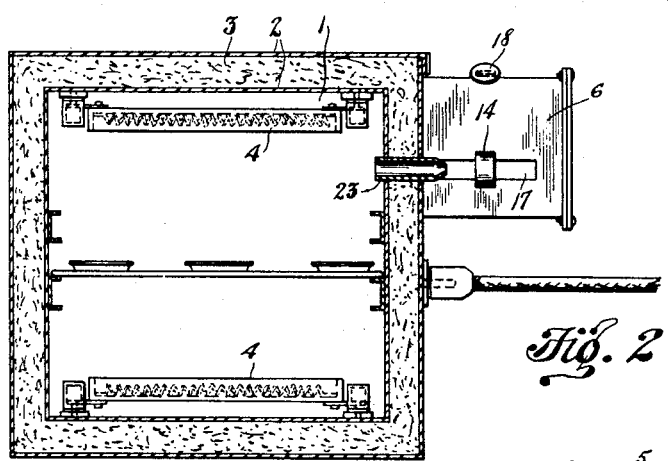

Figure 1 is a perspective view of a portion of a cooker, showing the improved thermally controlled, circuit operating means;

Fig. 2, a vertical sectional view through the improved cooker; and

Figure 3:
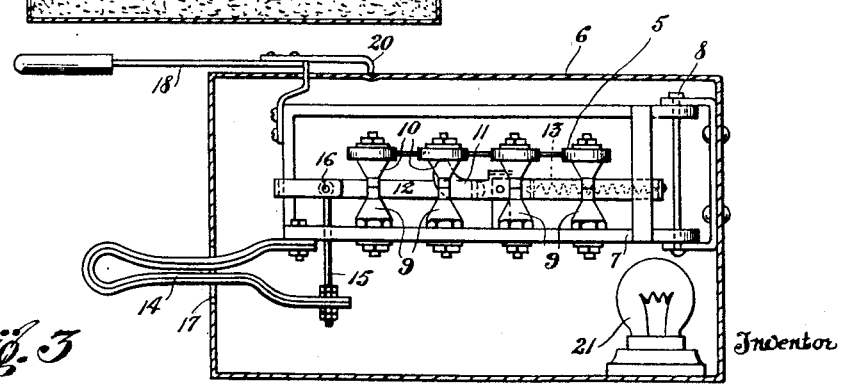

Fig. 3, a detail elevation of the switch and thermostat.

Similar numerals indicate corresponding parts throughout the drawing.

The cooker may comprise an insulated chamber or oven 1, of any suitable or desirable construction, having walls 2, which are spaced apart with an insulating material 3 located between the same.

One or more electric heating elements 4 are located within the chamber and connected, in usual manner, to an electric circuit, arranged to be opened and closed through a switch indicated generally at 5, which may be located in the box 6, supported upon one side of the cooker.

This switch is carried upon a frame 7, pivoted or hinged as at 8, to one side of the box 6, and carrying the fixed contact points 9. The movable contact points 10, are arranged to be seated upon the points 9, and to be raised, out of contact therewith by means of the toggle-levers 11 and 12 which are connected by a spring 13, in usual manner, to provide for a quick make and break, and prevent arcing between the points.

The thermostatic, or temperature responsive element 14, is substantially U-shaped, one end thereof being fixed to the swinging end of the hinged frame 7 and the other end to a link 15, pivotally connected to the lever 12 as at 16.

The body portion of the thermostat 14, extends through a horizontal slot 17, in the side of the switch box, and may be moved through the same when the frame 7 is swung upon its pivot by means of the handle 18, extended through the arcuate slot 19, in the top of the switch box, and provided with the latch 20, of any usual design, for holding the same in adjusted position.

If desired, a tell-tale lamp 21, may be located in the circuit, and visible through an opening 22, in the switch box, giving warning when the circuit is opened and closed.

A conduit 23, in the form of a nipple, communicates with the interior of the cooking chamber and is arranged to direct a jet of steam from the cooking food upon the thermostatic element 14.

From the above it will be obvious that as the cooking food reaches a sufficiently high temperature, steam generated from the same will issue from the nipple 23, in a jet, impinging directly upon the thermostatic element 14, which, readily responds to the change in temperature.

The rise in temperature will quickly cause this thermostatic element to expand or open, raising the lever 12, through the action of the link 15, and by means of the spring 13 and lever 11 the contact points 10 are instantaneously raised from the fixed contacts 9, quickly breaking the circuit.

As soon as the circuit to the heating elements is broken the temperature of the food will commence to drop, and the steam generated therefrom, instead of issuing from the nipple 23 in a jet, will rise as it leaves the nipple, permitting the temperature of the room to quickly cool the thermostatic element, when the same will contract or close, moving the contact points 10 back into contact with the points 9 and closing the circuit to the heating elements.

This operation is repeated continuously during the cooking of the food, thus substantially holding the food at any desired temperature throughout the entire cooking of the same.

The electric switch disclosed and described but not claimed herein has been made the subject matter of applicant's application for the electric switch per se entitled "Electric switch", filed July 18, 1925, Serial No. 44,603.

I claim:

1. The combination with an electrically heated, closed chamber, of a conduit communicating therewith and circuit controlling means including a thermostat located outside of the chamber, in the outside atmosphere and located in alinement with said conduit, and means for moving said thermostat toward or from the conduit.

2. The combination with an electrically heated, closed chamber, of a conduit communicating therewith and circuit controlling means including a thermostat located outside of the chamber, in the outside atmosphere and located in alinement with said conduit, and means for changing the relative positions of the thermostat and conduit to cause the thermostat to operate at different temperatures.

3. The combination with a closed chamber and heating means for said chamber of a conduit leading from said chamber and temperature responsive means outside of the chamber, in the atmosphere, and in the path of the heated fluid passing through and issuing from said conduit, for regulating said heating means.

4. The combination with a closed chamber and electric heating means therein, of a conduit leading from said chamber, a hinged frame outside of said chamber, a switch upon said frame for controlling the heating means and a thermostat upon said frame, controlling the switch and located in the path of heated fluid passing through and issuing from said conduit.

5. The combination with a closed chamber and electric heating means therein, of a conduit leading from said chamber, a hinged frame outside of said chamber, a switch upon said frame for controlling the heating means and a thermostat upon said frame, controlling the switch and located in the path of heated fluid passing through and issuing from said conduit, and means for holding the hinged frame in adjusted position.

In testimony that I claim the above, I have hereunto subscribed my name.

WILLIAM CAMPBELL.